United States Patent
Enomoto (10) Patent No.: US 11,351,504 B2
(45) Date of Patent: *Jun. 7, 2022

(54) HOLLOW FIBER MEMBRANE MODULE

(71) Applicant: NOK CORPORATION, Tokyo (JP)

(72) Inventor: Masami Enomoto, Shizuoka (JP)

(73) Assignee: NOK CORPORATION, Tokyo (JP)

( * ) Notice: Subject to any disclaimer, the term of this patent is extended or adjusted under 35 U.S.C. 154(b) by 43 days.

This patent is subject to a terminal disclaimer.

(21) Appl. No.: 16/963,558

(22) PCT Filed: Jul. 22, 2019

(86) PCT No.: PCT/JP2019/028703
§ 371 (c)(1),
(2) Date: Jul. 21, 2020

(87) PCT Pub. No.: WO2020/026875
PCT Pub. Date: Feb. 6, 2020

(65) Prior Publication Data
US 2020/0353416 A1    Nov. 12, 2020

(30) Foreign Application Priority Data
Jul. 30, 2018    (JP) .............................. JP2018-142504

(51) Int. Cl.
*B01D 63/02* (2006.01)
*B01D 53/22* (2006.01)
(Continued)

(52) U.S. Cl.
CPC .......... *B01D 63/022* (2013.01); *B01D 53/22* (2013.01); *B01D 53/268* (2013.01); *B01D 63/04* (2013.01);
(Continued)

(58) Field of Classification Search
None
See application file for complete search history.

(56) References Cited

U.S. PATENT DOCUMENTS 4,374,802 A * 2/1983 Fukasawa .............. B01D 63/02
422/48
11,219,865 B2 * 1/2022 Takeuchi ............... B01D 53/22
(Continued)

FOREIGN PATENT DOCUMENTS

JP    H03-019535 U    2/1991
JP    2004-202478    * 7/2004 ............. B01D 63/02
(Continued)

OTHER PUBLICATIONS

English language machine translation for JP 2004-202478. Retrieved from translationportal.epo.org on Oct. 28, 2021. (Year: 2021).*

(Continued)

*Primary Examiner* — Jason M Greene
(74) *Attorney, Agent, or Firm* — Greenblum & Bernstein, P.L.C.

(57) ABSTRACT

A hollow fiber membrane module includes: a tubular case; a hollow fiber membrane bundle; and a pair of sealing and fixing portions, in which an outside-membrane channel that passes by an outer wall of each of the hollow fiber membranes and an inside-membrane channel that passes through the hollow inside of each of the hollow fiber membranes are formed, moist air flows through the outside-membrane channel, and dry air flows through the inside-membrane channel, whereby moisture in the moist air is supplied to the dry air by a membrane separation effect of the hollow fiber membranes, wherein a plurality of spaces are disposed between the case inner wall and the hollow fiber membrane bundle, and a restriction portion that restricts the hollow fiber membrane from entering into the spaces is partially disposed between the hollow fiber membrane bundle and each of the spaces.

3 Claims, 6 Drawing Sheets

(51) Int. Cl.
    *B01D 53/26* (2006.01)
    *B01D 63/04* (2006.01)
    *H01M 8/04119* (2016.01)
(52) U.S. Cl.
    CPC .... *B01D 2053/224* (2013.01); *B01D 2313/04* (2013.01); *B01D 2313/06* (2013.01); *B01D 2313/143* (2013.01); *B01D 2313/20* (2013.01); *B01D 2313/23* (2013.01); *H01M 8/04149* (2013.01)

(56) References Cited

U.S. PATENT DOCUMENTS

| | | | | |
|---|---|---|---|---|
| 2005/0241482 | A1* | 11/2005 | Berger | B01D 63/02 96/8 |
| 2009/0152199 | A1* | 6/2009 | Ma | B01D 63/02 210/640 |
| 2009/0242474 | A1* | 10/2009 | Shirakawa | B01D 63/02 210/321.84 |
| 2010/0068603 | A1* | 3/2010 | Kanazawa | B01D 63/02 429/423 |
| 2016/0036075 | A1 | 2/2016 | Kim et al. | |

FOREIGN PATENT DOCUMENTS

| | | |
|---|---|---|
| JP | 2004-202478 A | 7/2004 |
| JP | 2007-283292 A | 11/2007 |
| JP | 2011-141083 A | 7/2011 |
| JP | 2016-35895 A | 3/2016 |

OTHER PUBLICATIONS

ISR for PCT/JP2019/028703 dated Oct. 15, 2019.

* cited by examiner

*Fig.6*
Background Art

HOLLOW FIBER MEMBRANE MODULE

TECHNICAL FIELD

The present disclosure relates to a hollow fiber membrane module usable in humidification apparatuses and dehumidification apparatuses.

BACKGROUND ART

Figure 6:
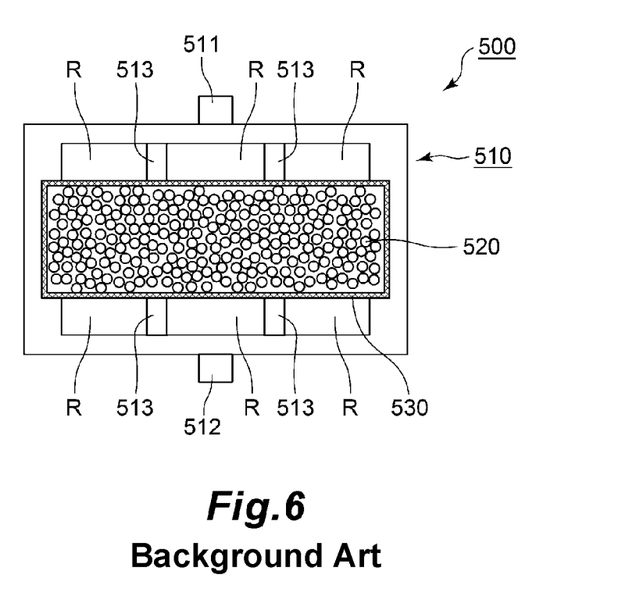
FIG. 6 is a front view of a hollow fiber membrane module according to a conventional example.

For example, in solid polymer fuel cells, a humidification apparatus that uses a hollow fiber membrane module is provided to humidify an electrolyte membrane. With reference to FIG. 6, a hollow fiber membrane module according to a conventional example will be described. FIG. 6 is a front view of a hollow fiber membrane module according to the conventional example.

A hollow fiber membrane module 500 according to the conventional example includes a tubular case 510 and hollow fiber membrane bundles 520 accommodated in the case 510. In the hollow fiber membrane module 500, an outside-membrane channel passing by an outer wall of each of the hollow fiber membranes and an inside-membrane channel passing through the hollow inside of each of the hollow fiber membranes are formed. The hollow fiber membrane module 500 can be used as a humidification apparatus when a hydrophilic material is used as a material of the hollow fiber membrane. That is, when moist air flows along the outside-membrane channel and dry air flows along the inside-membrane channel, due to a membrane separation effect of the hollow fiber membrane, the moisture in the moist air is supplied to the dry air and the dry air can be humidified. Since the moist air is deprived of moisture, the hollow fiber membrane module can be also used as a dehumidification apparatus for drying the moist air.

In order to enhance humidification efficiency of the hollow fiber membrane module 500 described above, how high the percentage of a membrane area contributing to a membrane separation effect with respect to an entire membrane area of the hollow fiber membranes accommodated in the case 510 is important. In the case 510, a moist air supply port 511 and a moist air exhaust port 512 are disposed in an upper part and a lower part of the case 510 in FIG. 6, respectively. When an outer circumferential surface of the hollow fiber membrane bundle 520 is in close contact with an entire inner wall of the case 510, the flow of fluid is apt to concentrate near the supply port 511 and near the exhaust port 512. Therefore, in the hollow fiber membrane module 500 according to the illustrated conventional example, a plurality of rectification projections 513 for rectifying the flow of fluid is disposed on the inner wall of the case 510. The rectification projection 513 is disposed to protrude toward the outer circumferential surface of the hollow fiber membrane bundle 520 and extend from one end of the case 510 toward the other end (in the drawing, the deeper side from the front side of the drawing surface) so that a space (gap) R is secured between the hollow fiber membrane bundle 520 and the inner wall of the case 510. By disposing such a rectification projection 513, it is possible to prevent the flow of fluid from concentrating near the supply port 511 and near the exhaust port 512 and to increase the percentage of the membrane area contributing to the membrane separation effect.

However, as in the hollow fiber membrane module 500, when the space R is disposed, a large gap may be formed between the hollow fiber membranes due to a portion of the hollow fiber membrane being deformed in order to enter into the space R. In this way, moist air may leak through the large gap to flow from the supply port 511 to the exhaust port 512 and the membrane area that does not contribute to the membrane separation effect may increase. Therefore, conventionally, the hollow fiber membrane bundle 520 is accommodated in the case 510 in a state in which the hollow fiber membrane bundle 520 is inserted in a tube 530 manufactured using a resin mesh. The tube 530 is manufactured by forming meshes in a tubular form and heat-welding the ends thereof. Therefore, the manufacturing cost of the tube 530 is high and an operation cost for inserting the hollow fiber membrane bundle 520 in the tube 530 is incurred.

CITATION LIST

Patent Literature

[PTL 1] Japanese Patent Application Publication No. 2007-283292

SUMMARY OF INVENTION

Technical Problem

An object of the present disclosure is to provide a hollow fiber membrane module capable of stabilizing the attitudes of hollow fiber membranes even when a hollow fiber membrane bundle is not inserted in a tube.

Solution to Problem

The present disclosure employs the following means in order to solve the problem.

That is, a hollow fiber membrane module of the present disclosure includes:

a tubular case;

a hollow fiber membrane bundle made up of a plurality of hollow fiber membranes that is accommodated in the case; and a pair of sealing and fixing portions that seals an opening at each of both ends of the case and fixes the hollow fiber membrane bundle to the case on one end and the other end of the case in a state in which a hollow inside of each of the hollow fiber membranes is open, wherein an outside-membrane channel that passes by an outer wall of each of the hollow fiber membranes and an inside-membrane channel that passes through the hollow inside of each of the hollow fiber membranes are formed, moist air flows through the outside-membrane channel, and dry air flows through the inside-membrane channel, whereby moisture in the moist air is supplied to the dry air due to a membrane separation effect of the hollow fiber membranes, a plurality of spaces serving as a channel through which moist air flows from one end of the case to the other end are disposed between the case inner wall and the hollow fiber membrane bundle, and a restriction portion that restricts the hollow fiber membrane from entering into the space is partially disposed between the hollow fiber membrane bundle and each of the spaces.

According to the present disclosure, a plurality of spaces serving as a channel through which moist air flows from one end of the case to the other end are disposed between the case inner wall and the hollow fiber membrane bundle. Therefore, it is possible to suppress the flow of moist air from concentrating in certain locations. Moreover, since the restriction portion is disposed, it is possible to restrict the hollow fiber membrane from entering into the space and to suppress deformation of the hollow fiber membrane. In this way, it is possible to stabilize the attitudes of the hollow fiber membranes. Therefore, it is possible to suppress a large gap from being formed between the hollow fiber membranes.

An outside-membrane channel inlet disposed at a position closer to one end of the case and an outside-membrane channel outlet disposed at a position closer to the other end of the case on a side opposite to the outside-membrane channel inlet with the hollow fiber membrane bundle disposed therebetween may be disposed in the case, and the space may be disposed between the hollow fiber membrane bundle and a portion of the case inner wall including an opening of the outside-membrane channel inlet, and the space may be formed between the hollow fiber membrane bundle and a portion of the case inner wall including an opening of the outside-membrane channel outlet.

In this way, it is possible to suppress the flow of moist air from concentrating near the outside-membrane channel inlet and the outside-membrane channel outlet.

The case may include a pair of opposing planar portions and a pair of side wall portions connecting both sides of the pair of planar portions, the outside-membrane channel inlet may be disposed in one of the pair of planar portions and the outside-membrane channel outlet may be disposed in the other planar portion, and the hollow fiber membrane bundle may be in contact with an inner wall of the pair of side wall portions and may not be in contact with an inner wall of the pair of planar portions whereby the space is disposed.

In this way, a space is disposed between the hollow fiber membrane bundle and the planar portion where the outside-membrane channel inlet is disposed, a space is disposed between the hollow fiber membrane bundle and the planar portion where the outside-membrane channel outlet is disposed, and a space (gap) is not formed between the hollow fiber membrane bundle and the pair of side wall portions. Therefore, when moist air flows from the space close to the outside-membrane channel inlet to the space close to the outside-membrane channel outlet, the moist air does not leak from between the hollow fiber membrane bundle and the pair of side wall portions and the moist air flows through the entire hollow fiber membrane bundle.

A plurality of rectification projections that protrudes toward an outer circumferential surface of the hollow fiber membrane bundle so that the space is secured, and extends from one end of the case to the other end to rectify the flow of fluid may be disposed on the inner wall of the pair of planar portions.

The restriction portion may be a beam-shaped portion connecting the rectification projection and the side wall portion and connecting the adjacent rectification projections.

The respective configurations can be employed in combinations as much as possible.

Advantageous Effects of Invention

As described above, according to the present disclosure, it is possible to stabilize the attitudes of hollow fiber membranes even when a hollow fiber membrane bundle is not inserted in a tube.

DESCRIPTION OF EMBODIMENTS

Hereinafter, mode for carrying out the present disclosure will be described in detail on the basis of exemplary embodiments with reference to the drawings. However, dimensions, materials, shapes, relative arrangements, and the like of components disclosed in the embodiment are not intended to limit the scope of the present disclosure unless particularly stated otherwise. A hollow fiber membrane module according to the present embodiment can be ideally used as a humidification apparatus for humidifying an electrolyte membrane in a solid polymer fuel cell, for example. However, the hollow fiber membrane module can be also used as a dehumidification apparatus.

Embodiment

Figure 1:
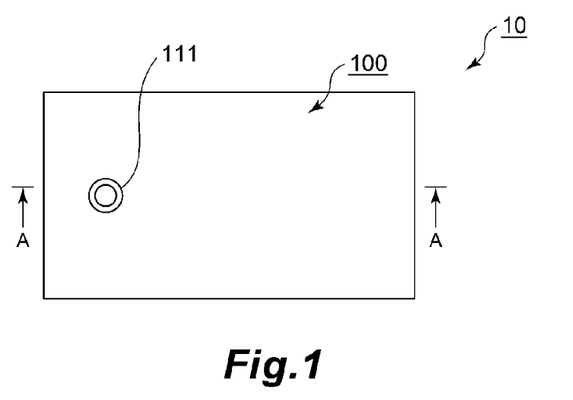
FIG. 1 is a plan view of a hollow fiber membrane module according to an embodiment of the present disclosure.
Figure 2:
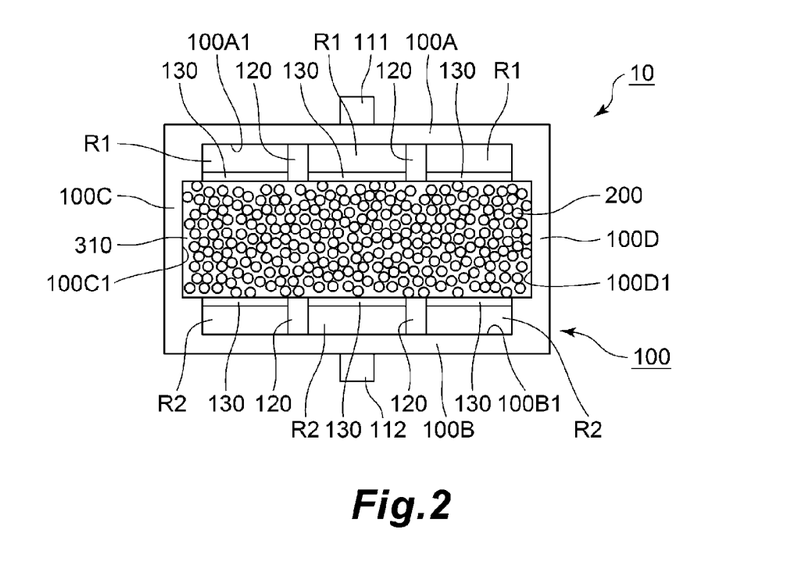
FIG. 2 is a front view of the hollow fiber membrane module according to the embodiment of the present disclosure.
Figure 3:
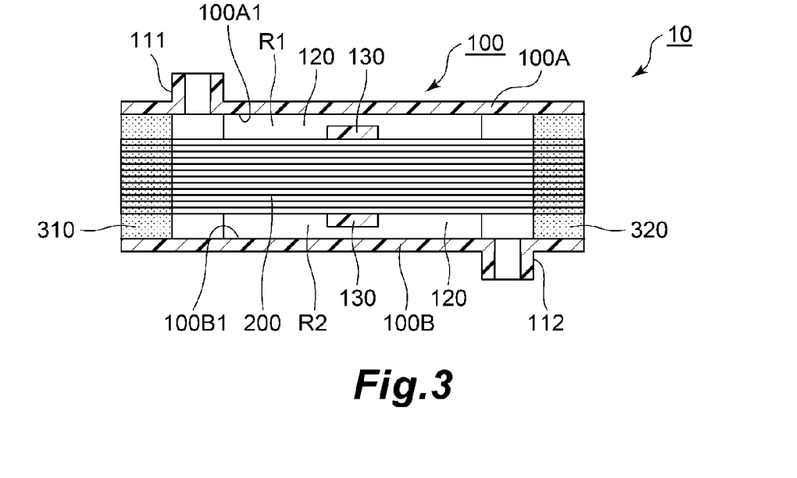
FIG. 3 is a schematic cross-sectional view of the hollow fiber membrane module according to the embodiment of the present disclosure.
Figure 4:
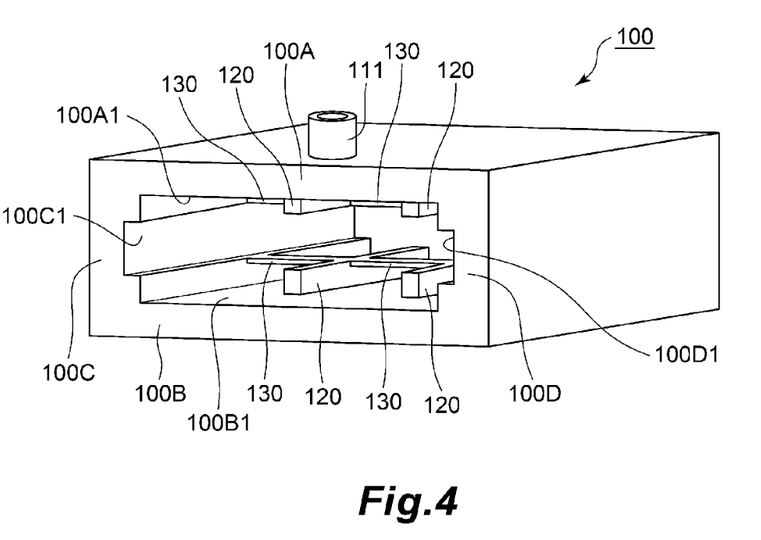
FIG. 4 is a perspective view of a case according to the embodiment of the present disclosure.
Figure 5:
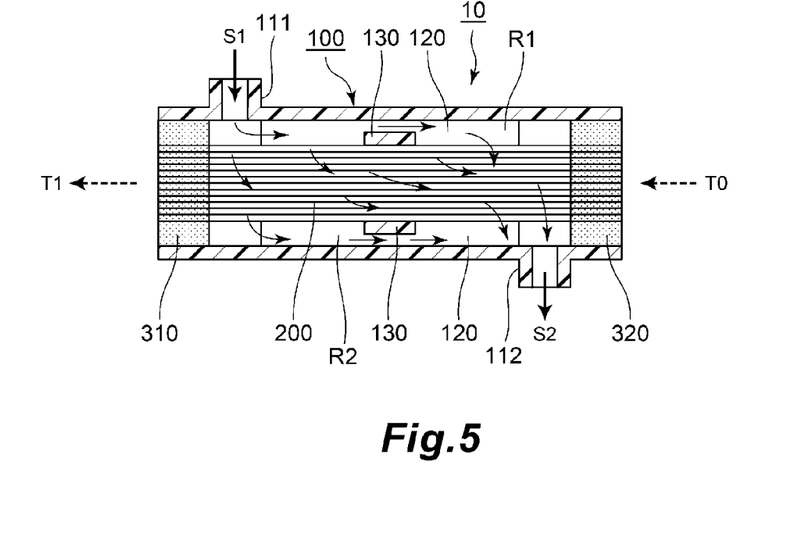
FIG. 5 is a schematic cross-sectional view illustrating a major configuration of a humidification apparatus that uses the hollow fiber membrane module according to the embodiment of the present disclosure.

With reference to FIGS. 1 to 5, a hollow fiber membrane module according to an embodiment of the present disclosure will be described. FIG. 1 is a plan view of a hollow fiber membrane module according to an embodiment of the present disclosure. FIG. 2 is a front view of the hollow fiber membrane module according to the embodiment of the present disclosure and corresponds to a view when the hollow fiber membrane module is seen from the left side in FIG. 1. FIG. 3 is a schematic cross-sectional view of the hollow fiber membrane module according to the embodiment of the present disclosure and is a cross-sectional view along arrows A-A in FIG. 1. FIG. 4 is a perspective view of a case disposed in the hollow fiber membrane module according to the embodiment of the present disclosure. FIG. 5 is a schematic cross-sectional view when the hollow fiber membrane module according to the embodiment of the present disclosure is used as a humidification apparatus.

<Humidification Apparatus>

A case in which a hollow fiber membrane module according to the present embodiment is used as a humidification apparatus will be described particularly with reference to FIG. 5. A hollow fiber membrane module 10 includes a tubular case 100, a hollow fiber membrane bundle 200 made up of a plurality of hollow fiber membranes accommodated in the case 100, and a pair of sealing and fixing portions 310 and 320 that fixes the hollow fiber membrane bundle 200 on one end and the other end of the case 100, respectively. In the hollow fiber membrane module 10 configured in this manner, an outside-membrane channel (see solid-line arrows S1 and S2 in FIG. 5) passing through an outer wall of each of the hollow fiber membranes and an inside-membrane channel (see dot-line arrows T0 and T1 in FIG. 5) passing through the follow inside of each of the hollow fiber membranes are formed.

A supply port 111 serving as an outside-membrane channel inlet for supplying moist air to the outside-membrane channel and an exhaust port 112 serving as an outside-membrane channel outlet for exhausting moist air (dried moist air) are disposed in the case 100. Moreover, the hollow fiber membrane module 10 is used such that dry air is supplied from an opening on the other end side (the side where the sealing and fixing portion 320 is disposed) of the case 100 and dry air (humidified dry air) is exhausted from an opening on one end side (the side where the sealing and fixing portion 310 is disposed) of the case 100.

<Hollow Fiber Membrane Module>

The hollow fiber membrane module 10 will be described in more detail. As described above, the hollow fiber membrane module 10 includes the case 100, the hollow fiber membrane bundle 200, and the pair of sealing and fixing portions 310 and 320. The hollow fiber membrane bundle 200 has a configuration in which a plurality of (several hundreds to several ten thousands) hollow fiber membranes are bundled. A hydrophilic material is used as a material of the hollow fiber membrane. For example, Nafion having a property of transmitting moisture by dissolution and diffusion, PPSU (polyphenylsulfone) having a property of transmitting moisture by a capillary condensation mechanism based on pore size control, and the like can be ideally used. Since these materials have low elution properties and high strength, these materials can be ideally used in a humidification apparatus and a dehumidification apparatus. The pair of sealing and fixing portions 310 and 320 seal the openings at both ends of the case 100 and fix the hollow fiber membrane bundle 200 to the case 100 on one end side and the other end side of the case 100 in a state in which the hollow inside of each of the hollow fiber membranes is open. These sealing and fixing portions 310 and 320 are formed by curing of a potting material such as an epoxy resin.

<Case>

The case 100 will be described in more detail. The case 100 includes a pair of opposing planar portions 100A and 100B and a pair of side wall portions 100C and 100D connecting both sides of the pair of planar portions 100A and 100B. Moreover, the supply port 111 serving as an outside-membrane channel inlet is disposed in one planar portion 100A, and the exhaust port 112 serving as an outside-membrane channel outlet is disposed in the other planar portion 100B. The supply port 111 is disposed at a position closer to one end side of the case 100, and the exhaust port 112 is disposed at a position closer to the other end side of the case 100 and on the opposite side from the supply port 111 with the hollow fiber membrane bundle 200 disposed therebetween. Moreover, a rectification projection 120 protruding toward the outer circumferential surface of the hollow fiber membrane bundle 200 is disposed on the inner wall of each of the pair of planar portions 100A and 100B so that spaces R1 and R2 are secured. In the present embodiment, two rectification projections 120 are disposed in each of the planar portions 100A and 100B. The plurality of rectification projections 120 extend from one end of the case 100 toward the other end to perform a role of rectifying the flow of fluid.

The hollow fiber membrane bundle 200 is in contact with the inner walls 100C1 and 100D1 of the pair of side wall portions 100C and 100D, and is not in contact with the inner walls 100A1 and 100B1 of the pair of planar portions 100A and 100B since the rectification projections 120 are disposed. In this way, the spaces R1 and R2 are disposed. That is, the space R1 is formed between the hollow fiber membrane bundle 200 and a portion (the inner wall 100A1 of the planar portion 100A) of the case inner wall including the opening of the supply port 111, and the space R2 is formed between the hollow fiber membrane bundle 200 and a portion (the inner wall 100B1 of the planar portion 100B) of the case inner wall including the opening of the exhaust port 112. In this way, a plurality of spaces R1 and R2 serving as a channel through which moist air flows from one end of the case 100 toward the other end are disposed between the hollow fiber membrane bundle 200 and the case inner wall.

A beam-shaped portion 130 as a restriction portion restricting the hollow fiber membrane from entering into the spaces R1 and R2 is disposed partially between the hollow fiber membrane bundle 200 and the spaces R1 and R2. More specifically, the beam-shaped portion 130 is disposed to connect the rectification projection 120 and the side wall portions 100C and 100D and to connect the adjacent rectification projections 120. The case 100 according to the present embodiment is a resin molded product. That is, the case 100 in which the pair of planar portions 100A and 100B, the pair of side wall portions 100C and 100D, the plurality of rectification projections 120, and the plurality of beam-shaped portions 130 are disposed integrally can be obtained by resin-molding using a mold.

<Humidifying (Dehumidifying) Mechanism>

A humidifying (dehumidifying) mechanism of the hollow fiber membrane module 10 according to the present embodiment will be described. As described above, in the hollow fiber membrane module 10 according to the present embodiment, an outside-membrane channel passing by the outer wall of each of the hollow fiber membranes of the hollow fiber membrane bundle 200 and an inside-membrane channel passing through the hollow inside of each of the hollow fiber membranes are formed. The outside-membrane channel is a channel through which fluid is exhausted from the supply port 111 to the exhaust port 112 along the outer wall of each of the hollow fiber membranes of the hollow fiber membrane bundle 200 (see the solid-line arrows S1 and S2 in FIG. 5). The inside-membrane channel is a channel through which fluid is exhausted from the other end of the case 100 to one end of the case 100 along the hollow inside of each of the hollow fiber membranes of the hollow fiber membrane bundle 200 (see the dot-line arrows T0 and T1 in FIG. 5).

In the present embodiment, the hollow fiber membrane module 10 is used such that moist air flows through the outside-membrane channel and dry air flows through the inside-membrane channel. In this way, moisture in the moist air is supplied to the dry air and the dry air is humidified by the membrane separation effect of the hollow fiber membrane. Since the moist air is deprived of moisture, the moist air is dried. Therefore, the hollow fiber membrane module 10 can be used as a humidification apparatus or a dehumidification apparatus. Since a gap is secured between the planar portion 100A and the beam-shaped portion 130 and between the planar portion 100B and the beam-shaped portion 130, when moist air flows through the spaces R1 and R2, the beam-shaped portions 130 do not become a hindrance.

<Advantages of Hollow Fiber Membrane Module According to Present Embodiment>

According to the hollow fiber membrane module 10 according to the present embodiment, a plurality of spaces R1 and R2 serving as a channel through which moist air flows from one end of the case 100 to the other end are disposed between the hollow fiber membrane bundle 200 and the inner wall of the case 100. Therefore, it is possible to suppress the flow of moist air from concentrating in certain locations, and to allow moist air to easily flow through the hollow fiber membrane bundle 200 over an entire area from one end side of the case 100 to the other end side and to increase the percentage of the membrane area contributing to the membrane separation effect. In the hollow fiber membrane module 10 according to the present embodiment, since the beam-shaped portion 130 as a restriction portion is disposed in the case 100, the hollow fiber membrane is restricted from entering into the spaces R1 and R2 and deformation of the hollow fiber membrane can be suppressed. In this way, it is possible to stabilize the attitudes of the hollow fiber membranes. Therefore, it is possible to suppress a large gap from being formed between the hollow fiber membranes. Therefore, it is possible to suppress moist air from leaking through a gap formed between the hollow fiber membranes from the space R1 to the space R2. In this respect, it is possible to increase the percentage of the membrane area contributing to the membrane separation effect.

The space R1 is disposed between the hollow fiber membrane bundle 200 and the portion (the inner wall 100A1 of the planar portion 100A) of the case inner wall including an opening of the supply port 111, and the space R2 is disposed between the hollow fiber membrane bundle 200 and the portion (the inner wall 100B1 of the planar portion 100B) of the case inner wall including an opening of the exhaust port 112. In this way, it is possible to suppress the flow of moist air from concentrating near the supply port 111 ad the exhaust port 112.

Furthermore, in the hollow fiber membrane module 10 according to the present embodiment, a space (gap) is not formed between the hollow fiber membrane bundle 200 and the pair of side wall portions 100C and 100D. Due to this, when moist air flows from the space R1 close to the supply port 111 to the space R2 close to the exhaust port 112, moist air does not leak between the hollow fiber membrane bundle 200 and the pair of side wall portions 100C and 100D, and the moist air flows over the entire hollow fiber membrane bundle 200. Therefore, it is possible to increase the percentage of the membrane area contributing to the membrane separation effect.

(Others)

In the above-described embodiment, a case in which the moist air flowing through the outside-membrane channel and the dry air flowing through the inside-membrane channel flow in opposite directions has been described. However, the moist air flowing through the outside-membrane channel and the dry air flowing through the inside-membrane channel may flow in the same direction. For example, in the inside-membrane channel, the dry air may flow in a direction opposite to the dot-line arrow. However, in order to enhance the humidification efficiency and the dehumidification efficiency, the moist air and the dry air may flow in opposite directions. Moreover, in the above-described embodiment, a case in which the beam-shaped portion 130 is disposed only in one location near the center between one end and the other end of the case 100. However, the beam-shaped portion 130 may be disposed at a plurality of locations between one end and the other end of the case 100.

REFERENCE SIGNS LIST

10 Hollow fiber membrane module
100 Case
100A, 100B Planar portion
100A1, 100B1 Inner wall
100C, 100D Side wall portion
100C1, 100D1 Inner wall
111 Supply port
112 Exhaust port
120 Rectification projection
130 Beam-shaped portion
200 Hollow fiber membrane bundle
310, 320 Sealing and fixing portion
R1, R2 Space

The invention claimed is:

1. A hollow fiber membrane module comprising:
 a tubular case;
 a hollow fiber membrane bundle made up of a plurality of hollow fiber membranes that is accommodated in the case; and
 a pair of seal and fixation portions that seals an opening at each of two ends of the case and fixes the hollow fiber membrane bundle to the case on one end and another end of the case in a condition in which a hollow inside of each of the hollow fiber membranes is open, wherein
 the case includes a pair of opposing planar portions and a pair of side wall portions each connecting two sides of the pair of planar portions,
 an outside-membrane channel that passes by an outer wall of each of the hollow fiber membranes and an inside-membrane channel that passes through the hollow inside of each of the hollow fiber membranes are formed, moist air flows through the outside-membrane channel, and dry air flows through the inside-membrane channel, whereby moisture in the moist air is supplied to the dry air due to a membrane separation effect of the hollow fiber membranes,
 a plurality of spaces serving as a channel through which the moist air flows from the one end of the case to the another end are disposed between an inner wall of the case and the hollow fiber membrane bundle, and
 a restriction portion that restricts the hollow fiber membrane from entering into the spaces is partially disposed between the hollow fiber membrane bundle and each of the spaces, wherein
 a plurality of rectification projections that protrudes toward an outer circumferential surface of the hollow fiber membrane bundle such that the spaces are secured, and extends from the one end of the case to the another end to rectify a flow of the moist air, is disposed on an inner wall of the pair of planar portions, and
 the restriction portion is a beam-shaped portion connecting the rectification projections and the side wall portions of the case and connecting adjacent rectification projections.

2. The hollow fiber membrane module according to claim 1, wherein
 an outside-membrane channel inlet disposed in the case at a position closer to the one end of the case and an outside-membrane channel outlet disposed in the case at a position closer to the another end of the case on a side opposite to the outside-membrane channel inlet, with the hollow fiber membrane bundle disposed between the outside-membrane channel inlet and the outside-membrane channel outlet, and
 the spaces include at least one space disposed between the hollow fiber membrane bundle and a portion of the inner wall of the case including an opening of the outside-membrane channel inlet, and the spaces include at least one space formed between the hollow fiber membrane bundle and a portion of the inner wall of the case including an opening of the outside-membrane channel outlet.

3. The hollow fiber membrane module according to claim 2, wherein
   the outside-membrane channel inlet is disposed in one of the pair of planar portions and the outside-membrane channel outlet is disposed in the other one of the pair of planar portions, and
   the hollow fiber membrane bundle is in contact with an inner wall of the pair of side wall portions and is not in contact with the inner wall of the pair of planar portions whereby the spaces are disposed.

* * * * *